(12) United States Patent
Furusho et al.

(10) Patent No.: US 12,529,500 B2
(45) Date of Patent: Jan. 20, 2026

(54) ADSORPTION HEAT PUMP

(71) Applicants: DAIKIN INDUSTRIES, LTD., Osaka (JP); Atomis Inc., Kyoto (JP)

(72) Inventors: Kazuhiro Furusho, Osaka (JP); Akinari Sugiyama, Osaka (JP); Michiru Kagawa, Osaka (JP); Daisuke Asari, Kyoto (JP); Dai Kataoka, Kyoto (JP); Kenji Sumida, Kyoto (JP)

(73) Assignees: DAIKIN INDUSTRIES, LTD, Osaka (JP); ATOMIS INC., Hyogo (JP)

( * ) Notice: Subject to any disclaimer, the term of this patent is extended or adjusted under 35 U.S.C. 154(b) by 461 days.

(21) Appl. No.: 18/029,166

(22) PCT Filed: Sep. 29, 2021

(86) PCT No.: PCT/JP2021/035896
§ 371 (c)(1),
(2) Date: Mar. 29, 2023

(87) PCT Pub. No.: WO2022/071405
PCT Pub. Date: Apr. 7, 2022

(65) Prior Publication Data
US 2023/0375235 A1 Nov. 23, 2023

(30) Foreign Application Priority Data
Sep. 30, 2020 (JP) ................................. 2020-165351

(51) Int. Cl.
*F25B 30/04* (2006.01)
*B01J 20/22* (2006.01)
(Continued)

(52) U.S. Cl.
CPC ............. *F25B 30/04* (2013.01); *B01J 20/226* (2013.01); *B01J 20/3433* (2013.01);
(Continued)

(58) Field of Classification Search
CPC ....................................................... F25B 30/04
See application file for complete search history.

(56) References Cited

U.S. PATENT DOCUMENTS

2012/0172612 A1* 7/2012 Yaghi ..................... B01J 20/226
556/132
2015/0034500 A1 2/2015 Kim et al.
(Continued)

FOREIGN PATENT DOCUMENTS

CN 209484741 U 10/2019
EP 3 370 018 A1 9/2018
(Continued)

OTHER PUBLICATIONS

Extended European Search Report for corresponding European Application No. 21875703.7, dated Feb. 26, 2024.
(Continued)

*Primary Examiner* — William D Young
(74) *Attorney, Agent, or Firm* — Birch, Stewart, Kolasch & Birch, LLP

(57) ABSTRACT

A process for producing spherical activated carbon is complex; therefore, an adsorbent that has an effective adsorption amount larger than or equal to that of spherical activated carbon and that is easily produced is desired. An adsorption heat pump uses, as refrigerant, carbon dioxide and uses, as an adsorbent, a metal-organic framework including a metal ion and an organic ligand. The metal-organic framework is, for example, MOF-200.

6 Claims, 6 Drawing Sheets

(51) Int. Cl.
*B01J 20/34* (2006.01)
*C09K 5/04* (2006.01)
*F25B 17/08* (2006.01)

(52) U.S. Cl.
CPC .......... *B01J 20/3483* (2013.01); *C09K 5/047* (2013.01); *B01J 2220/50* (2013.01); *F25B 17/08* (2013.01)

(56) References Cited

U.S. PATENT DOCUMENTS

2015/0291870 A1* 10/2015 Van Horn ............. C07F 15/065 556/113
2017/0166661 A1 6/2017 Liang et al.

FOREIGN PATENT DOCUMENTS

| JP | 2015-529258 A | 10/2015 |
| JP | 2017-83082 A | 5/2017 |
| JP | 2017-522904 A | 8/2017 |
| JP | 6326051 B2 | 5/2018 |
| JP | 2018-146162 A | 9/2018 |
| JP | 2019-48294 A | 3/2019 |
| WO | WO 2014/028574 A2 | 2/2014 |

OTHER PUBLICATIONS

International Preliminary Report on Patentability and English translation of the Written Opinion of the International Searching Authority for International Application No. PCT/JP2021/035896, dated Apr. 13, 2023.

International Search Report (PCT/ISA/210), issued in PCT/JP2021/035896, dated Dec. 7, 2021.

Miyazaki, "Development of solar heat-driven refrigerating machine with carbon dioxide as refrigerant", Public interest incorporated foundation, Yashima Environment Technology Foundation, 2015 Research Result Report, 2015.

Jiang et al., "Preparation of Metal-Organic Frameworks and Application for CO2 Adsorption and Separation," Progress in Chemistry, vol. 26, No. 10, 2014, pp. 1645-1654, with English abstract.

* cited by examiner

ADSORPTION HEAT PUMP

TECHNICAL FIELD

The present disclosure relates to an adsorption heat pump.

BACKGROUND ART

Hitherto, as disclosed in NPL 1, an adsorption heat pump that uses carbon dioxide as refrigerant and uses spherical activated carbon as an adsorbent is known.

SUMMARY OF THE INVENTION

Technical Problem

A process for producing spherical activated carbon is complex; therefore, an adsorbent that has an effective adsorption amount larger than or equal to that of spherical activated carbon and that is easily produced is desired.

Solution to Problem

An adsorption heat pump according to a first aspect uses, as refrigerant, carbon dioxide and uses, as an adsorbent, a metal-organic framework including a metal ion and one or a plurality of organic ligands. At least one of the organic ligands is represented by

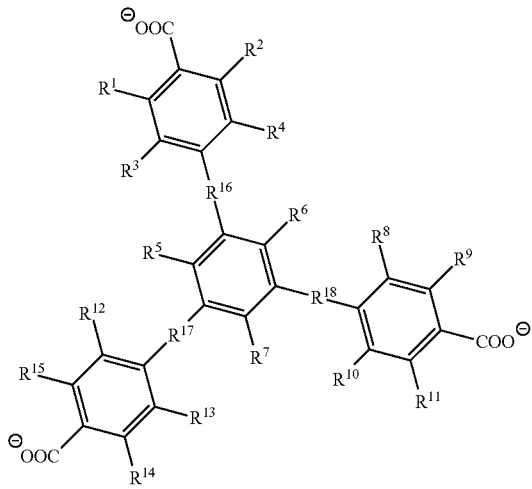

(in the formula, $R^1$ to $R^{15}$ are each independently selected from an alkyl group, an aryl group, an alkoxyl group, an alkene, an alkyne, a phenyl group, a substituted group thereof, a sulfur-containing group, a silicon-containing group, a nitrogen-containing group, an oxygen-containing group, a halogen, a nitro, an amino, a cyano, a boron-containing group, a phosphorus-containing group, a carboxylic acid, an ester, H, $NH_2$, CN, OH, =O, =S, Cl, I, F,

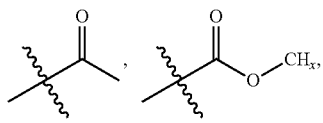

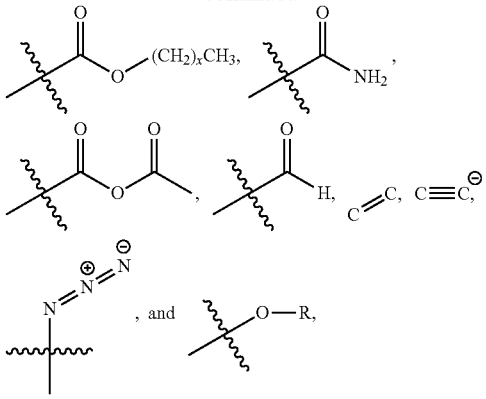

(in the formulae, x is 1, 2, or 3), $R^{16}$ to $R^{18}$ may be present or absent, and if present, $R^{16}$ to $R^{18}$ are selected from an alkyl group or cycloalkyl group containing 1 to 20 carbon atoms, an aryl group containing 1 to 5 phenyl rings, an alkyl amine, aryl amine, diazo, or alkyl amide containing an alkyl group or cycloalkyl group containing 1 to 20 carbon atoms or an aryl group containing 1 to 5 phenyl rings, and

—C≡C—).

The adsorption heat pump according to the first aspect uses an adsorbent that has a high effective adsorption amount and that is easily produced.

An adsorption heat pump according to a second aspect is the adsorption heat pump according to the first aspect, in which the metal-organic framework is MOF-200.

The adsorption heat pump according to the second aspect uses an adsorbent that has a high effective adsorption amount and that is easily produced.

An adsorption heat pump according to a third aspect is the adsorption heat pump according to the first aspect or the second aspect, in which a refrigeration cycle is performed such that a temperature and a pressure of the refrigerant at a time of high pressure are lower than critical points.

The adsorption heat pump according to the third aspect uses an adsorbent that has a high effective adsorption amount and that is easily produced.

An adsorption heat pump according to a fourth aspect is the adsorption heat pump according to the first aspect or the second aspect, in which a refrigeration cycle is performed such that one of a temperature and a pressure of the refrigerant at a time of high pressure is lower than a critical point.

The adsorption heat pump according to the fourth aspect uses an adsorbent that has a high effective adsorption amount and that is easily produced.

DESCRIPTION OF EMBODIMENTS

An adsorption heat pump 100 according to an embodiment of the present disclosure will be described with reference to the drawings.

(1) Configuration and Operation of Adsorption Heat Pump 100

The adsorption heat pump 100 is a device that uses the transfer of latent heat generated when refrigerant adsorbs to an adsorbent and when refrigerant desorbs from an adsorbent to generate cooling energy from a heat source at a relatively low temperature of 60° C. to 90° C.

Figure 1:
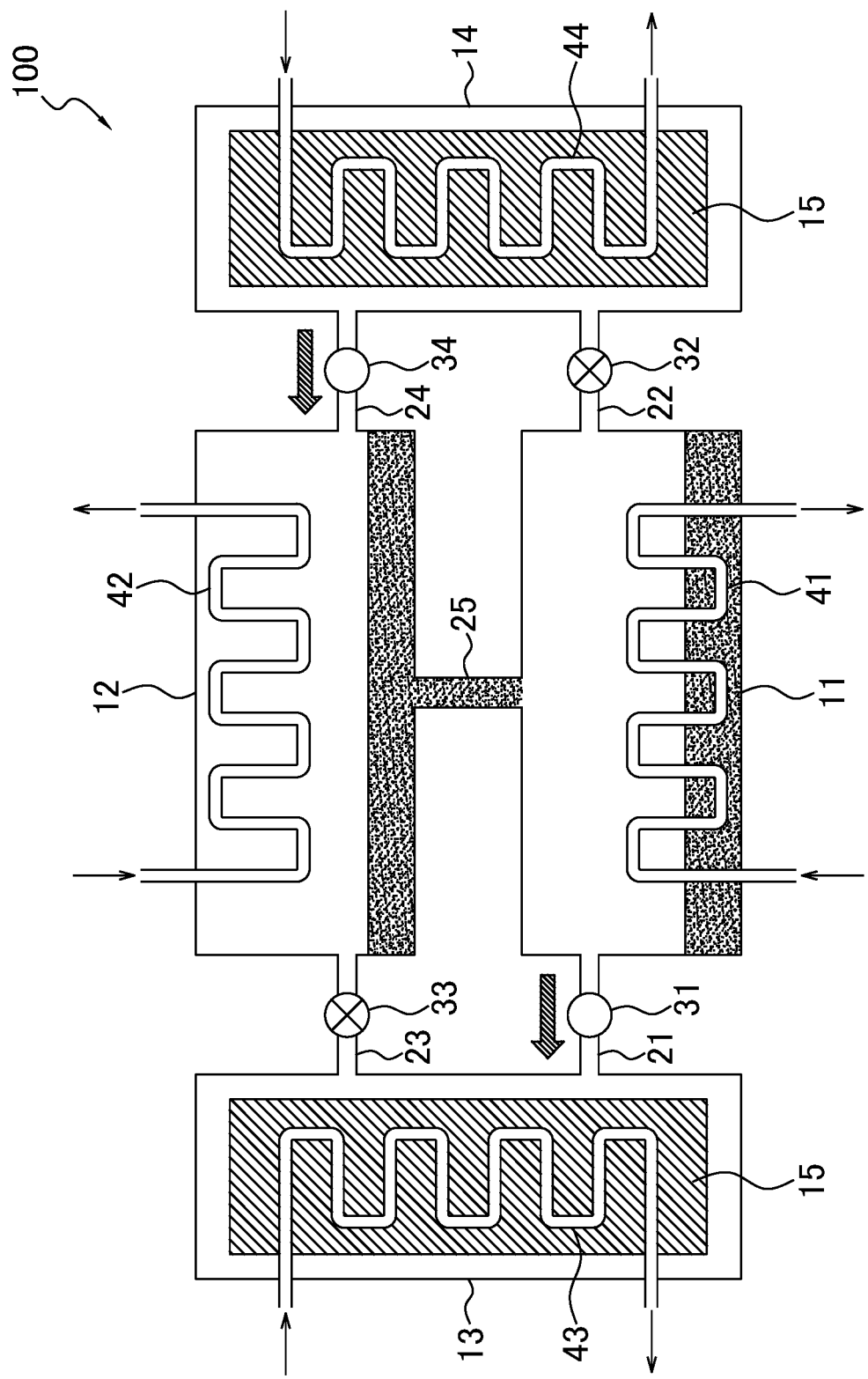
FIG. 1 is a schematic configuration view of an adsorption heat pump 100 in a first open-closed state.
Figure 2:
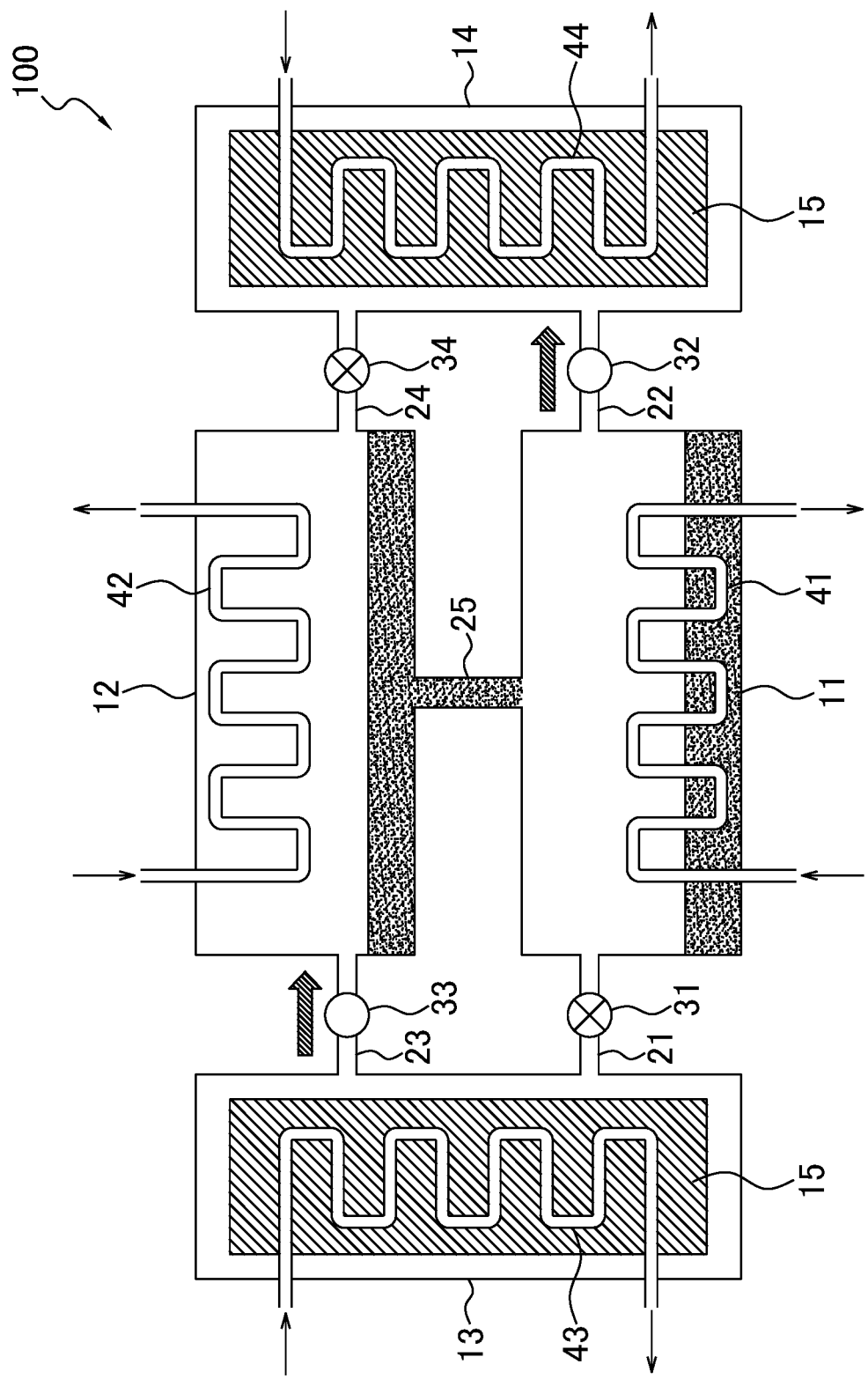
FIG. 2 is a schematic configuration view of the adsorption heat pump 100 in a second open-closed state.

As illustrated in FIGS. 1 and 2, the adsorption heat pump 100 mainly includes an evaporator 11, a condenser 12, a first adsorber 13, and a second adsorber 14. The evaporator 11 and the first adsorber 13 are connected by a first flow path 21. The evaporator 11 and the second adsorber 14 are connected by a second flow path 22. The condenser 12 and the first adsorber 13 are connected by a third flow path 23. The condenser 12 and the second adsorber 14 are connected by a fourth flow path 24. The evaporator 11 and the condenser 12 are connected by a fifth flow path 25. The first flow path 21 to the fourth flow path 24 are provided with a first valve 31 to a fourth valve 34 for opening and closing the flow paths, respectively.

The evaporator 11 evaporates liquid refrigerant to generate gas refrigerant. The condenser 12 condenses gas refrigerant to generate liquid refrigerant. The first adsorber 13 and the second adsorber 14 have an adsorbent 15 for adsorbing and desorbing refrigerant. The adsorbent 15 is a substance whose adsorption amount of refrigerant changes depending on the pressure and the temperature. In this embodiment, the refrigerant is carbon dioxide, and the adsorbent 15 is MOF-200, which is a metal-organic framework (MOF). The mass of the adsorbent 15 in the first adsorber 13 is equal to the mass of the adsorbent 15 of the second adsorber 14.

The evaporator 11 is a heat exchanger for extracting cooling energy. A first pipe 41 is arranged inside the evaporator 11. The first pipe 41 is a pipe through which a heat transfer medium flows, the heat transfer medium being a medium for transferring, to the outside, cooling energy generated when liquid refrigerant evaporates inside the evaporator 11. The heat transfer medium flowing inside the first pipe 41 is, for example, water. In FIG. 1, gas refrigerant is adsorbed by the adsorbent 15 in the first adsorber 13, and gas refrigerant thereby flows from the evaporator 11 into the first adsorber 13 through the first flow path 21. In FIG. 2, gas refrigerant is adsorbed by the adsorbent 15 in the second adsorber 14, and gas refrigerant thereby flows from the evaporator 11 into the second adsorber 14 through the second flow path 22. When the refrigerant is adsorbed in the first adsorber 13 and the second adsorber 14, gas refrigerant flows from the evaporator 11; therefore, evaporation of liquid refrigerant is accelerated in the evaporator 11. The cooling energy generated when liquid refrigerant evaporates, is transferred to the outside by the heat transfer medium flowing inside the first pipe 41 and used for, for example, cooling.

The condenser 12 is a heat exchanger for condensing gas refrigerant by cooling. A second pipe 42 is arranged inside the condenser 12. The second pipe 42 is a pipe through which a medium for condensing gas refrigerant inside the condenser 12 flows, the medium being a heat transfer medium at a temperature lower than the condensation temperature of the refrigerant or a heat transfer medium at a temperature lower than the temperature of the refrigerant when the refrigerant is in a supercritical state. The heat transfer medium flowing inside the second pipe 42 is, for example, water. In FIG. 1, gas refrigerant desorbs in the second adsorber 14, and the gas refrigerant flows from the second adsorber 14 into the condenser 12 through the fourth flow path 24. In FIG. 2, gas refrigerant desorbs in the first adsorber 13, and the gas refrigerant flows from the first adsorber 13 into the condenser 12 through the third flow path 23. Liquid refrigerant generated by condensation of the gas refrigerant in the condenser 12 is supplied to the evaporator 11 through the fifth flow path 25.

A third pipe 43 and a fourth pipe 44 are arranged inside the first adsorber 13 and the second adsorber 14, respectively. The adsorbent 15 is disposed around each of the third pipe 43 and the fourth pipe 44. The third pipe 43 is a pipe through which a heat transfer medium flows, the heat transfer medium being a medium for controlling the temperature of the adsorbent 15 in the first adsorber 13; the fourth pipe 44 is a pipe through which a heat transfer medium flows, the heat transfer medium being a medium for controlling the temperature of the adsorbent 15 in the second adsorber 14. The heat transfer media flowing inside the third pipe 43 and the fourth pipe 44 are, for example, water. By controlling the temperatures of the media flowing through the third pipe 43 and the fourth pipe 44, the temperatures of the adsorbents 15 are controlled such that adsorption or desorption of the refrigerant is performed in the first adsorber 13 and the second adsorber 14.

As illustrated in FIG. 1, in an adsorption process of causing the refrigerant to adsorb to the adsorbent 15 in the first adsorber 13, a medium at a temperature at which adsorption of the refrigerant occurs dominantly, is caused to flow through the third pipe 43. As illustrated in FIG. 1, in a desorption process of causing the refrigerant to desorb from the adsorbent 15 in the second adsorber 14, a medium at a temperature at which desorption of the refrigerant occurs dominantly, is caused to flow through the fourth pipe 44. For example, in FIG. 1, cold water for cooling the adsorbent 15 in the first adsorber 13, flows through the third pipe 43, and hot water for heating the adsorbent 15 in the second adsorber 14, flows through the fourth pipe 44.

As illustrated in FIG. 2, in an adsorption process of causing the refrigerant to adsorb to the adsorbent 15 in the second adsorber 14, a medium at a temperature at which adsorption of the refrigerant occurs dominantly, is caused to flow through the fourth pipe 44. As illustrated in FIG. 2, in a desorption process of causing the refrigerant to desorb from the adsorbent 15 in the first adsorber 13, a medium at a temperature at which desorption of the refrigerant occurs dominantly, is caused to flow through the third pipe 43. For example, in FIG. 2, cold water for cooling the adsorbent 15 in the second adsorber 14, flows through the fourth pipe 44, and hot water for heating the adsorbent 15 in the first adsorber 13, flows through the third pipe 43.

The adsorption heat pump 100 switches the open-closed states of the first valve 31 to the fourth valve 34 to repeat the adsorption processes and the desorption processes, and thus can continuously generate cooling energy from heating energy. Specifically, the adsorption heat pump 100 alternately switches a first open-closed state illustrated in FIG. 1 and a second open-closed state illustrated in FIG. 2. In the first open-closed state, the first valve 31 and the fourth valve 34 are in the open state, and the second valve 32 and the third valve 33 are in the closed state. In the second open-closed state, the first valve 31 and the fourth valve 34 are in the closed state, and the second valve 32 and the third valve 33 are in the open state.

In the first open-closed state, the first adsorber 13 is connected to the evaporator 11, and the second adsorber 14 is connected to the condenser 12. In the first adsorber 13, the adsorbent 15 is cooled by causing cold water or the like to flow through the third pipe 43. In the second adsorber 14, the adsorbent 15 is heated by causing hot water or the like to flow through the fourth pipe 44. Thus, the refrigerant supplied from the evaporator 11 adsorbs to the adsorbent 15 in the first adsorber 13, and the refrigerant desorbs from the adsorbent 15 in the second adsorber 14 and is supplied to the condenser 12.

In the second open-closed state, the second adsorber 14 is connected to the evaporator 11, and the first adsorber 13 is connected to the condenser 12. In the second adsorber 14, the adsorbent 15 is cooled by causing cold water or the like to flow through the fourth pipe 44. In the first adsorber 13, the adsorbent 15 is heated by causing hot water or the like to flow through the third pipe 43. Thus, the refrigerant supplied from the evaporator 11 adsorbs to the adsorbent 15 in the second adsorber 14, and the refrigerant desorbs from the adsorbent 15 in the first adsorber 13 and is supplied to the condenser 12.

The adsorption heat pump 100 alternately switches the first open-closed state and the second open-closed state, and the adsorption process and the desorption process are thereby alternately performed in each of the first adsorber 13 and the second adsorber 14. Accordingly, the adsorption heat pump 100 can continuously perform adsorption and desorption of the refrigerant and thus can continuously generate cooling energy.

(2) Details of Adsorbent 15

The adsorbent 15 disposed inside the first adsorber 13 and the second adsorber 14 is MOF-200, which is one of metal-organic frameworks (MOF). Metal-organic frameworks are crystalline compounds in which coordinate bonds between a metal and an organic substance are continuously formed. Metal-organic frameworks are generated by combining a metal ion or an organometallic salt and a cross-linkable organic ligand that binds the metal ion or the organometallic salt. Metal-organic frameworks may include a plurality of types of organic ligands.

Metal-organic frameworks are porous coordination polymers having a large number of voids (pores) therein. Metal-organic frameworks are used as, for example, porous materials having a function of selective storage and separation of molecules and ions. In this embodiment, a metal-organic framework is used as the adsorbent 15 for adsorbing and desorbing carbon dioxide serving as refrigerant.

Some of such metal-organic frameworks are called by various abbreviated names such as MOF-180 and MOF-200. As the surface area (specific surface area) per unit mass of a metal-organic framework increases, the numerical value included in the abbreviated name tends to increase.

A reference literature related to the metal-organic framework MOF-200 is, for example, Furukawa et al., "Ultrahigh Porosity in Metal-Organic Frameworks" (Science, 2010, 329, 424-428). As described in this reference literature, MOF-200 has a three-dimensional network structure in which an organometallic salt $Zn_4(CO_2)_6$ is coordinated by an organic ligand 4,4',4"-[benzene-1,3,5-triyl-tris(benzene-4,1-diyl)]tribenzoate (BBC). The organometallic salt $Zn_4O$ $(CO_2)_6$ has an octahedral structure. The organic ligand BBC has a triangular shape as represented by the following chemical structural formula.

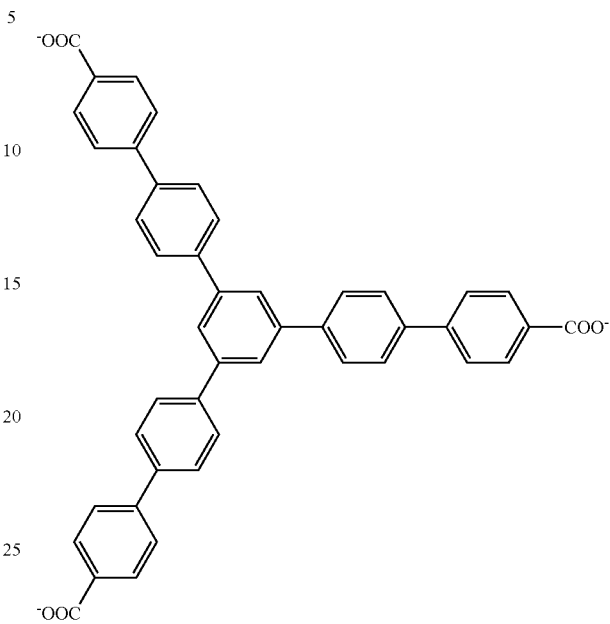

The three-dimensional network structure of MOF-200 is represented by "qom" in the reticular chemistry structure resource (RCSR) database. The qom structure is suitable for decreasing dead volume and increasing gas storage capacity per unit volume.

MOF-177, which is one of metal-organic frameworks, has the qom structure, which is the same as the structure of MOF-200. In the case of MOF-177, the organic ligand is 4,4',4"-benzene-1,3,5-triyl-tribenzoate (BTB). The organic ligand BTB is represented by the following chemical structural formula.

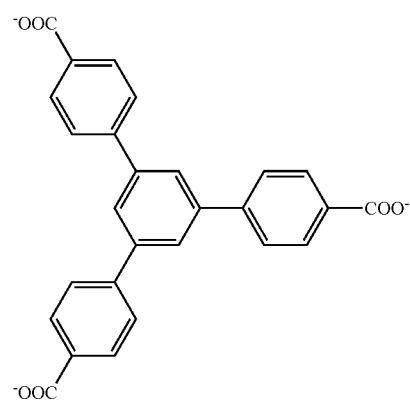

Basic physical properties of MOF-200 are as follows.
Porosity: 90%
Crystal density: 0.22 g/cm$^3$
Specific surface area measured by BET method: 4,530 m$^2$/g
Specific surface area measured by Langmuir method: 10,400 m$^2$/g
Geometric surface area: 6,400 m$^2$/g
Volume of voids: 3.59 cm$^3$/g The metal-organic framework can be synthesized by various methods. A solution method, which is the simplest synthesis method, is a method for generating a metal-organic framework by mixing a metal and an organic ligand in a solution at ordinary temperature and ordinary pressure. In the solution method, the size of crystals generated can be controlled by adjusting the mixing speed. In the case of MOF-200, a solution of a metal is a solution of the organometallic salt $Zn_4(CO_2)_6$. In this embodiment, the metal-organic framework may be synthesized by any method selected from known methods such as a diffusion method, a hydrothermal method, a microwave method, an ultrasonic wave method, and a solid-phase synthesis method besides the solution method.

The performance of the metal-organic framework serving as the adsorbent 15 is measured in terms of effective adsorption amount. In the case of the adsorption heat pump 100, the "effective adsorption amount" refers to a mass of refrigerant (carbon dioxide) that can be adsorbed and desorbed by a unit mass (1 g) of a metal-organic framework (MOF-200) in one adsorption cycle. In one adsorption cycle, the first adsorber 13 and the second adsorber 14 perform the adsorption process once and the desorption process once.

Figure 3:
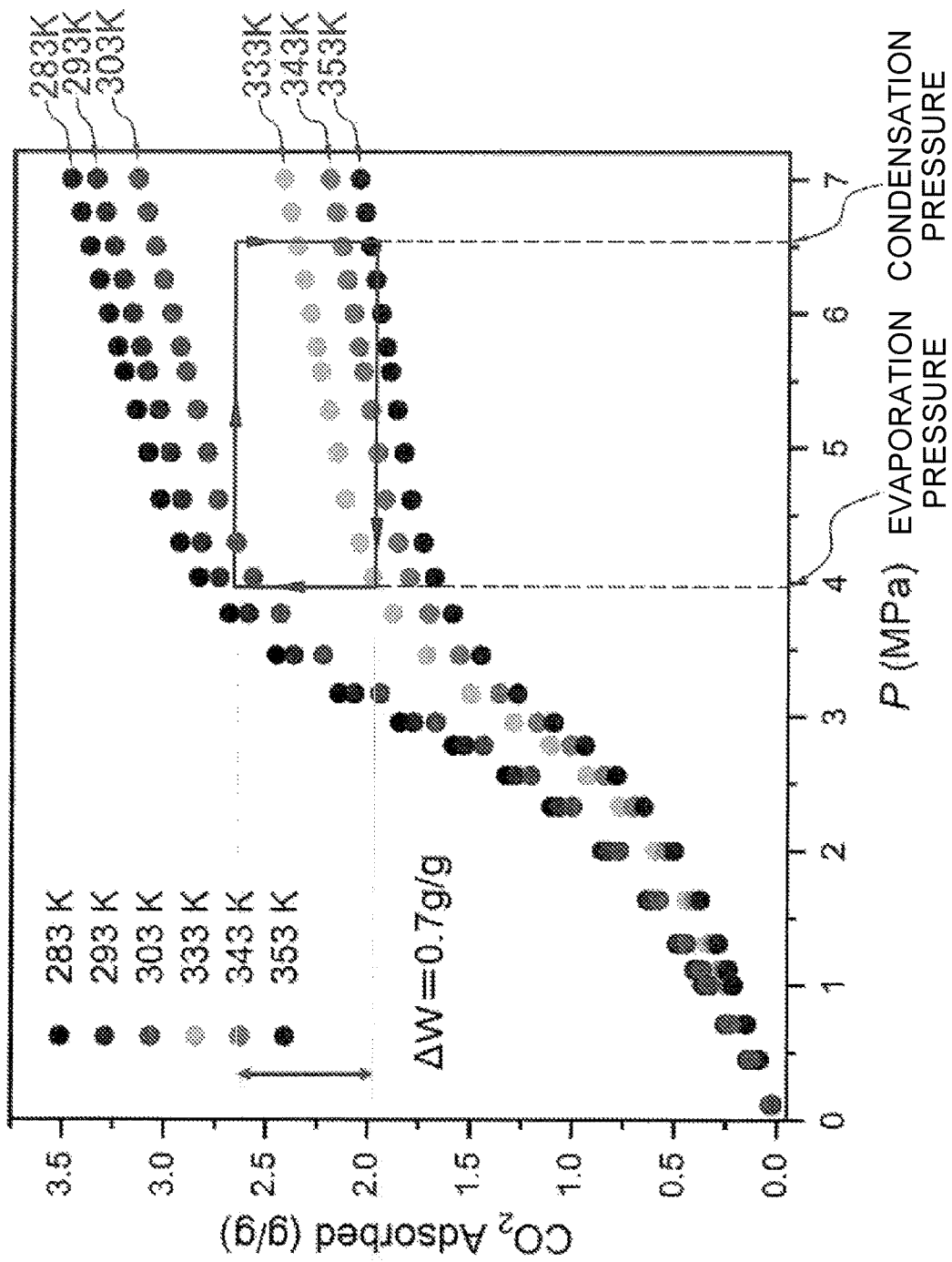
FIG. 3 is a graph of adsorption isotherm of MOF-200.

FIG. 3 is a graph of adsorption isotherm of MOF-200. FIG. 3 shows the relation between the pressure (MPa) and the absolute adsorption amount (g/g) of refrigerant (carbon dioxide) at six temperatures. The "absolute adsorption amount" refers to a mass of refrigerant adsorbed by a unit mass (1 g) of a metal-organic framework. The absolute adsorption amount can be measured with, for example, a magnetic suspension balance adsorption amount measuring device. As shown in FIG. 3, the adsorption isotherm shows different tendencies depending on the temperature.

In FIG. 3, an adsorption cycle is shown by a rectangle. In the adsorption cycle, the refrigerant is adsorbed to the adsorbent 15 (the adsorbent 15 in the first adsorber 13 in FIG. 1) at the evaporation pressure, and the refrigerant is desorbed from the adsorbent 15 (the adsorbent 15 in the second adsorber 14 in FIG. 1) at the condensation pressure. ΔW shown in FIG. 3 represents the amount of refrigerant newly adsorbed by the adsorbent 15 during one adsorption cycle and corresponds to the effective adsorption amount. As shown in FIG. 3, in the case of using MOF-200, the effective adsorption amount of the refrigerant is 0.7 g/g. In other words, the adsorption heat pump 100 can adsorb and desorb carbon dioxide in a mass determined by multiplying a dry mass of the adsorbent 15 in the first adsorber 13 or the second adsorber 14 by 0.7 in one adsorption cycle.

A capacity $Q_c$ of the adsorption heat pump 100 is represented by the following formula.

$$Q_c = M \times L \times \Delta W$$

(In the formula, M represents the dry mass of the adsorbent 15, L represents the evaporation latent heat of the refrigerant, and ΔW represents the effective adsorption amount of the adsorbent 15.)

As represented by the above formula, the higher the effective adsorption amount of refrigerant, the higher the capacity $Q_c$ of the adsorption heat pump 100. Therefore, an adsorbent 15 having a high effective adsorption amount is desired. Metal-organic frameworks are easily generated and enable the production of compounds having various chemical and physical properties depending on the combination of the metal and the organic ligand thereof. Among metal-organic frameworks, MOF-200 has a higher effective adsorption amount of carbon dioxide than other metal-organic frameworks and other porous materials.

Figure 4:
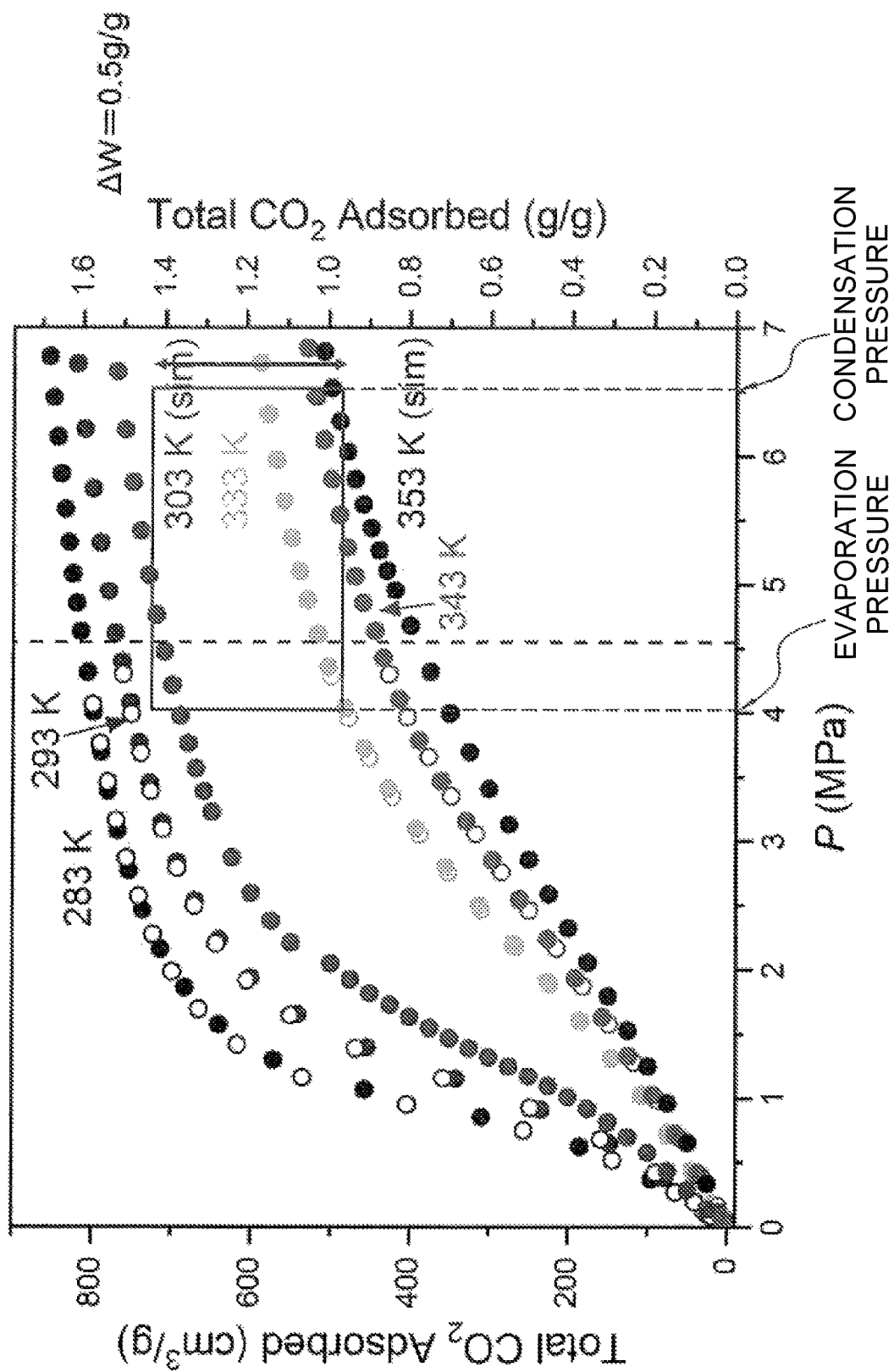
FIG. 4 is a graph of adsorption isotherm of MOF-177 used as a comparative example.

As a comparative example, FIG. 4 shows a graph of adsorption isotherm of MOF-177. As shown in FIG. 4, the metal-organic framework MOF-177 has an effective adsorption amount of 0.5 g/g.

Figure 5:
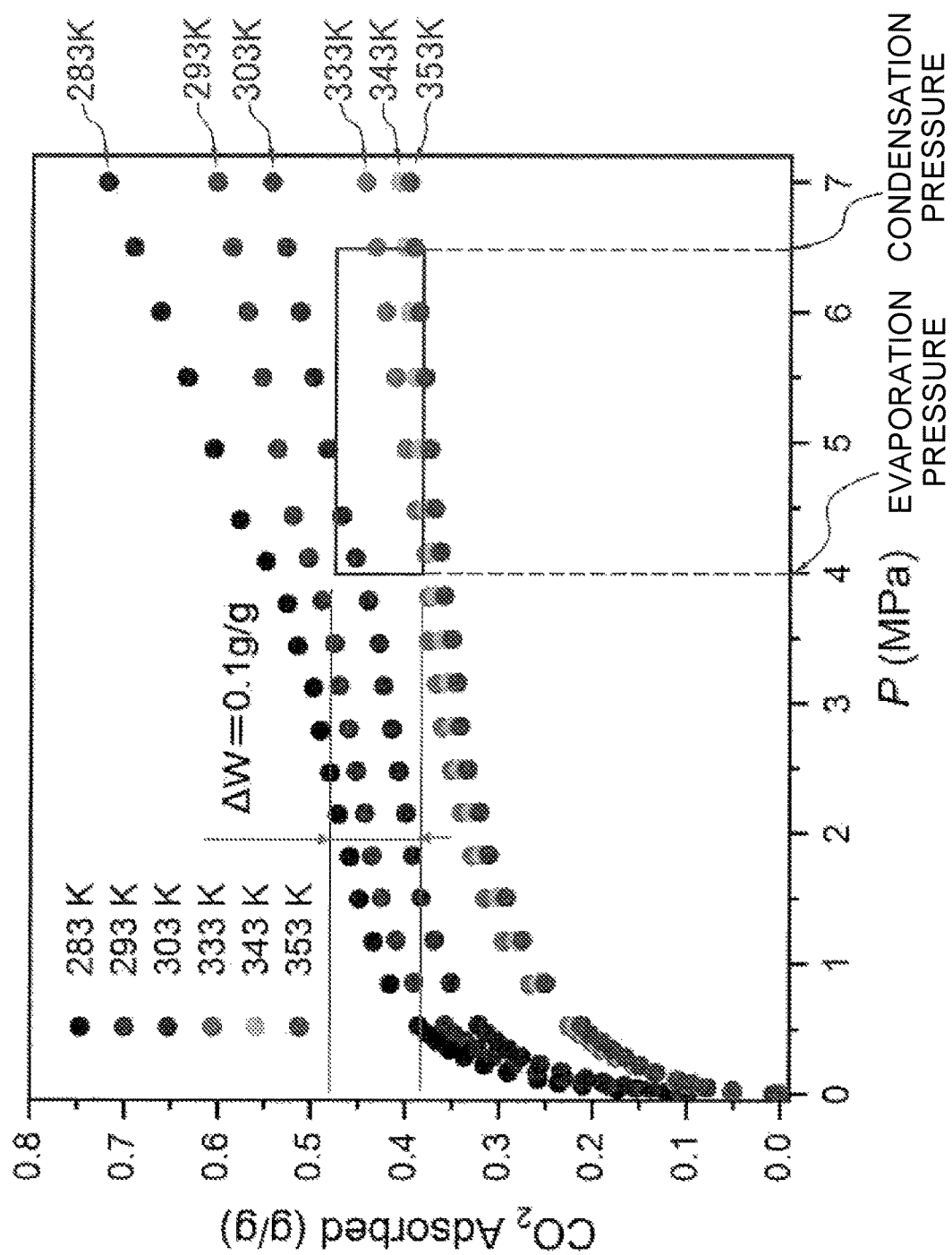
FIG. 5 is a graph of adsorption isotherm of MOF-74 (Mg) used as a comparative example.

As another comparative example, FIG. 5 shows a graph of adsorption isotherm of MOF-74 (Mg), which is one of metal-organic frameworks. As shown in FIG. 5, the metal-organic framework MOF-74 (Mg) has an effective adsorption amount of 0.1 g/g.

The spherical activated carbon disclosed in NPL 1 has an effective adsorption amount of 0.55 g/g. Thus, the metal-organic framework MOF-200 has good performance as an adsorbent compared with MOF-177, MOF-74 (Mg), and the spherical activated carbon.

(3) Features

Hitherto, as disclosed in NPL 1, an adsorption heat pump 100 that uses activated carbon as an adsorbent is known. However, the metal-organic framework used as the adsorbent 15 in the adsorption heat pump 100 of this embodiment is generated easily and at low cost compared with activated carbon.

In general, the process for producing activated carbon includes a step of crushing a raw material such as coal into granules and performing molding, a step of subsequently subjecting the resulting molded material to dry distillation at a high temperature of 700° C. to 800° C. for a long time to carbonize the molded material, and an activation step of subsequently causing a reaction with water vapor at a high temperature of 900° C. to 1,000° C. to form pores. In contrast, the process for producing a metal-organic framework includes only mixing solutions of a metal and an organic ligand at ordinary temperature and ordinary pressure, as described above. Furthermore, in the case where the size of pores and the specific surface area are made uniform, the process for producing activated carbon requires an activation step using an alkali solution, resulting in high cost, whereas the process for producing a metal-organic framework does not require any special step. Thus, the adsorption heat pump 100 that uses a metal-organic framework as the adsorbent 15 is good in terms of production cost.

In addition, various types of metal-organic frameworks can be generated by various combinations of metals and organic ligands. Among metal-organic frameworks, MOF-200 is particularly good in terms of effective adsorption amount of carbon dioxide. With an increase in the effective adsorption amount of substance used as the adsorbent 15, the amount of adsorbent 15 used can be reduced, and the cost can be reduced. Accordingly, the adsorption heat pump 100 that uses the metal-organic framework MOF-200 as the adsorbent 15 is preferred in view of efficiency of the refrigerating capacity and the cost compared with the case where another metal-organic framework such as MOF-177 is used.

(4) Modifications

Modifications of the above embodiment will be described below. Some or all of the contents of each modification may be combined with the contents of another modification as long as they do not contradict each other.

(4-1) Modification A

The configuration of the adsorption heat pump 100 is not limited to those illustrated in FIGS. 1 and 2. For example, the adsorption heat pump 100 may be provided with dampers that are opened and closed by the atmospheric pressure instead of the first valve 31 to the fourth valve 34 installed in the first flow path 21 to the fourth flow path 24, respectively.

In this modification, for example, dampers that are opened by the pressure of the refrigerant evaporated in the evaporator 11 are installed instead of the first valve 31 and the second valve 32. A damper that is opened by the pressure of the refrigerant desorbed from the adsorbent 15 in the first adsorber 13 is installed instead of the third valve 33. A damper that is opened by the pressure of the refrigerant desorbed from the adsorbent 15 in the second adsorber 14 is installed instead of the fourth valve 34.

(4-2) Modification B

In the first open-closed state, the adsorption heat pump 100 causes a medium for cooling the adsorbent 15 to flow through the third pipe 43 in the first adsorber 13 and causes a medium for heating the adsorbent 15 to flow through the fourth pipe 44 in the second adsorber 14. In the second open-closed state, the adsorption heat pump 100 causes a medium for heating the adsorbent 15 to flow through the third pipe 43 in the first adsorber 13, and causes a medium for cooling the adsorbent 15 to flow through the fourth pipe 44 in the second adsorber 14.

The adsorption heat pump 100 needs to have a cooling circuit through which a medium for cooling the adsorbent 15 is caused to circulate and a heating circuit through which a medium for heating the adsorbent 15 is caused to circulate. The adsorption heat pump 100 may have a mechanism capable of switching between the cooling circuit and the heating circuit in accordance with the open-closed state.

(4-3) Modification C

The adsorption heat pump 100 preferably performs a refrigeration cycle such that, during the rated operation, the temperature and the pressure of the refrigerant at a time of high pressure are lower than critical points. The "refrigerant at a time of high pressure" refers to the refrigerant in a state of the condensation pressure in the adsorption cycle and is specifically the refrigerant within the condenser 12.

Figure 6:
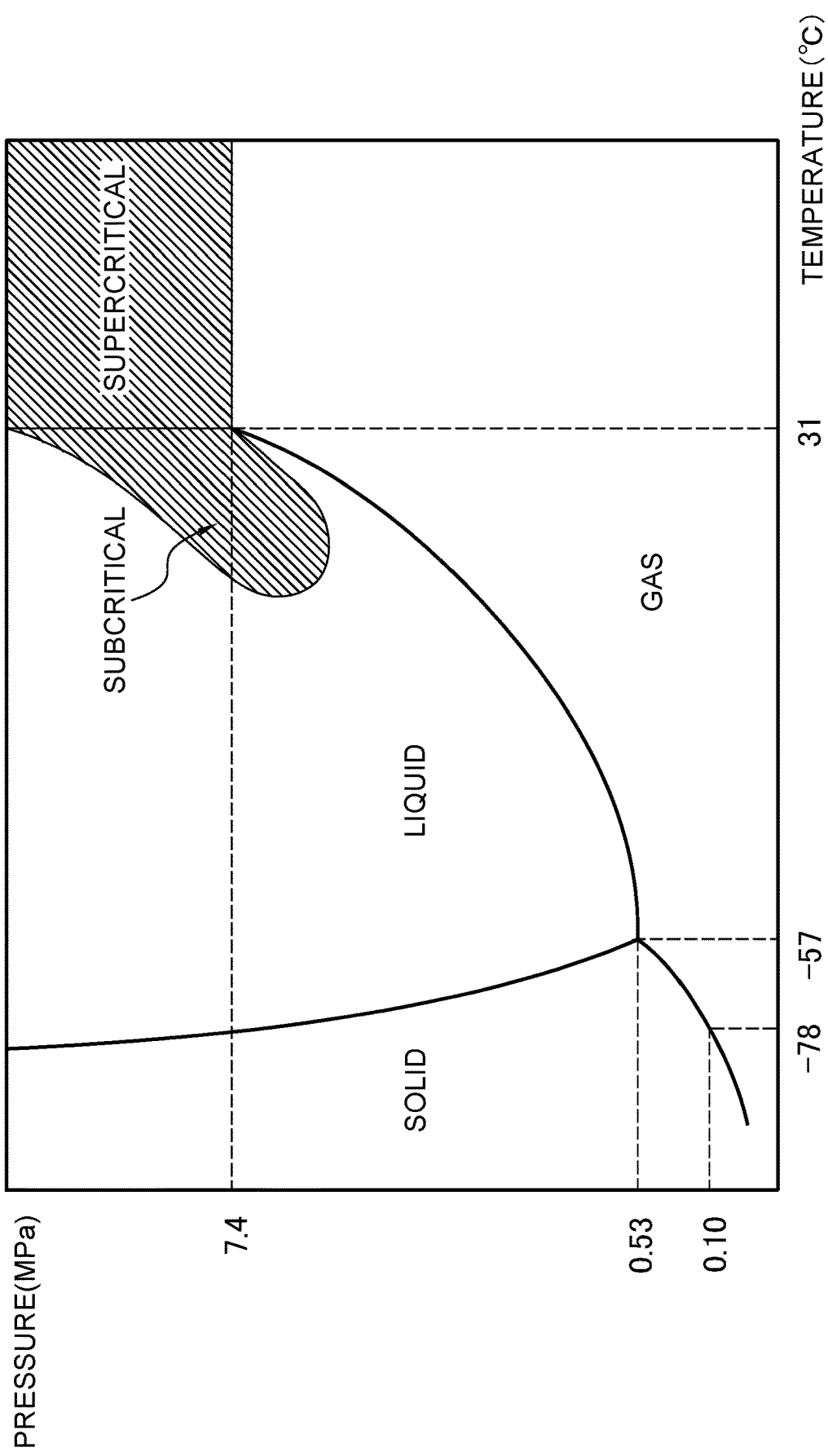
FIG. 6 is a phase diagram of carbon dioxide.

FIG. 6 is a phase diagram of carbon dioxide, which is the refrigerant used in the adsorption heat pump 100. In the case of carbon dioxide, the critical point of the temperature is about 31° C., and the critical point of the pressure is about 7.4 MPa. When both the temperature and the pressure are higher than or equal to the critical points, carbon dioxide is in a supercritical state in which gas and liquid cannot coexist. Accordingly, the adsorption heat pump 100 preferably controls the pressure and the temperature of the refrigerant at the time of high pressure such that both the temperature and the pressure are lower than the critical points.

(4-4) Modification D

The adsorption heat pump 100 may perform a refrigeration cycle such that, during the rated operation, one of the temperature and the pressure of the refrigerant at the time of high pressure is lower than the critical point. In this modification, the adsorption heat pump 100 may control the pressure and the temperature of the refrigerant such that the refrigerant at the time of high pressure is in a subcritical state. The "subcritical state" refers to a state where one of the temperature and the pressure is lower than the critical point.

As shown in FIG. 6, the subcritical state is usually a state where the temperature is lower than the critical point and the pressure is close to the critical point. In the subcritical state, the pressure may be higher than or equal to the critical point.

(4-5) Modification E

As shown in FIG. 3, the metal-organic framework MOF-200 has an effective adsorption amount of 0.7 g/g. However, the effective adsorption amount of the metal-organic framework MOF-200 is affected by various parameters such as the degrees of uniformity of the size of pores and the specific surface area of MOF-200. Therefore, the effective adsorption amount of the metal-organic framework MOF-200 may be within a predetermined range. For example, the effective adsorption amount of the metal-organic framework MOF-200 may be within a range of 0.65 g/g to 0.75 g/g.

The evaporation pressure and the condensation pressure of the adsorption cycle shown in FIG. 3 may also be within predetermined ranges. For example, in FIG. 3, the evaporation pressure may be within a range of 3.5 MPa to 4.5 MPa, and the condensation pressure may be within a range of 6.0 MPa to 7.0 MPa.

(4-6) Modification F

The metal-organic framework used in the embodiment is MOF-200. However, the metal-organic framework is not limited to MOF-200 as long as the effective adsorption amount is within a predetermined range. The predetermined range of the effective adsorption amount is, for example, 0.65 g/g to 0.75 g/g.

Specifically, the metal-organic framework used in the adsorption heat pump 100 may be, for example, a metal-organic framework having at least one organic ligand represented by the following formula.

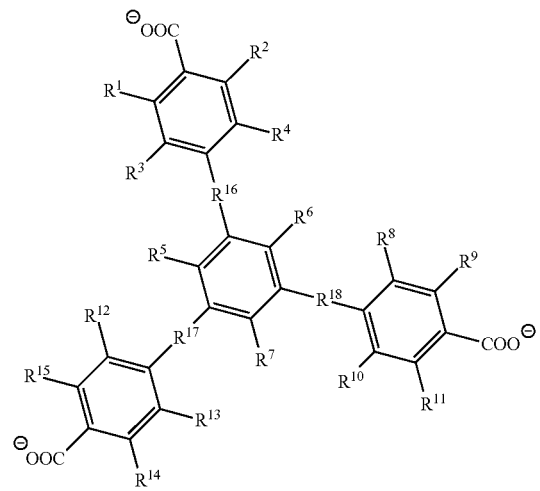

(In the formula, $R^1$ to $R^{15}$ are each independently selected from an alkyl group, an aryl group, an alkoxyl group, an alkene, an alkyne, a phenyl group, a substituted group thereof, a sulfur-containing group, a silicon-containing group, a nitrogen-containing group, an oxygen-containing group, a halogen, a nitro, an amino, a cyano, a boron-containing group, a phosphorus-containing group, a carboxylic acid, an ester, H, $NH_2$, CN, OH, =O, =S, Cl, I, F,

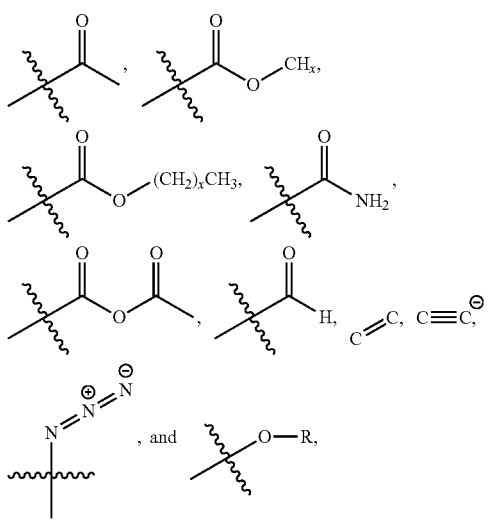

(in the formulae, x is 1, 2, or 3),
R$^{16}$ to R$^{18}$ may be present or absent, and if present, R$^{16}$ to R$^{18}$ are selected from
an alkyl group or cycloalkyl group containing 1 to 20 carbon atoms,
an aryl group containing 1 to 5 phenyl rings,
an alkyl amine, aryl amine, diazo, or alkyl amide containing an alkyl group or cycloalkyl group containing 1 to 20 carbon atoms or an aryl group containing 1 to 5 phenyl rings, and
—C≡C—.)

(4-7) Modification G

The adsorption heat pump 100 has the first valve 31 to the fourth valve 34. The timings of opening and closing the first valve 31 to the fourth valve 34 may be appropriately set in accordance with, for example, the evaporation pressure and the condensation pressure of the adsorption cycle, and the amounts of refrigerant in the evaporator 11 and the condenser 12.

(4-8) Modification H

The adsorption heat pump 100 includes the evaporator 11 and the condenser 12. When carbon dioxide is used as the refrigerant, the evaporator 11 and the condenser 12 are preferably, for example, cross-fin tube type heat exchangers.

(4-9) Modification I

The adsorption heat pump 100 uses, for example, carbon dioxide as the refrigerant. Therefore, the temperature of the heat transfer medium flowing inside the first pipe 41 of the evaporator 11 becomes below the freezing point. Accordingly, the adsorption heat pump 100 can be used as, for example, a refrigerating machine.

CONCLUSION

An embodiment of the present disclosure has been described above. It is to be understood that the forms and the details can be changed in various ways without departing from the spirit and scope of the present disclosure described in the claims.

REFERENCE SIGNS LIST

15: adsorbent
100: adsorption heat pump

CITATION LIST

Non-Patent Literature

NPL 1: Takahiko MIYAZAKI, "Development of solar heat-driven refrigerating machine with carbon dioxide as refrigerant", Public interest incorporated foundation, Yashima Environment Technology Foundation, 2015 Research Result Report

The invention claimed is:

1. An adsorption heat pump that uses carbon dioxide as refrigerant,
   wherein a metal-organic framework including a metal ion and one or a plurality of organic ligands is used as an adsorbent, and
   at least one of the organic ligands is represented by

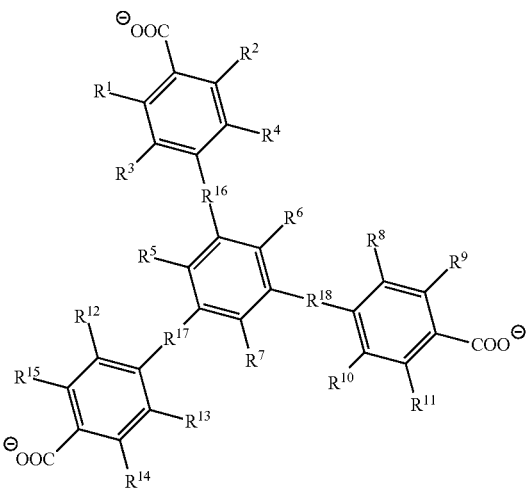

(where R$^1$ to R$^{15}$ are each independently selected from an alkyl group, an aryl group, an alkoxyl group, an alkene, an alkyne, a phenyl group, a substituted group thereof, a sulfur-containing group, a silicon-containing group, a nitrogen-containing group, an oxygen-containing group, a halogen, a nitro, an amino, a cyano, a boron-containing group, a phosphorus-containing group, a carboxylic acid, an ester, H, NH$_2$, CN, OH, =O, =S, Cl, I, F,

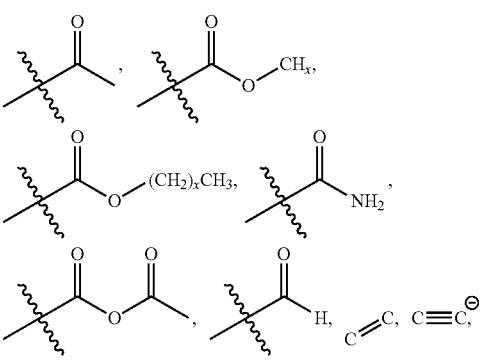

-continued

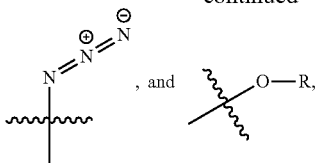

(where x is 1, 2, or 3), $R^{16}$ to $R^{18}$ may be present or absent, and if present, $R^{16}$ to $R^{18}$ are selected from an alkyl group or cycloalkyl group containing 1 to 20 carbon atoms, an aryl group containing 1 to 5 phenyl rings, an alkyl amine, aryl amine, diazo, or alkyl amide containing an alkyl group or cycloalkyl group containing 1 to 20 carbon atoms or an aryl group containing 1 to 5 phenyl rings, and

—C≡C—).

2. The adsorption heat pump according to claim 1, wherein the metal-organic framework is MOF-200.

3. The adsorption heat pump according to claim 1, wherein a refrigeration cycle is performed such that a temperature and a pressure of the refrigerant at a time of high pressure are lower than critical points.

4. The adsorption heat pump according to claim 1, wherein a refrigeration cycle is performed such that one of a temperature and a pressure of the refrigerant at a time of high pressure is lower than a critical point.

5. The adsorption heat pump according to claim 2, wherein a refrigeration cycle is performed such that a temperature and a pressure of the refrigerant at a time of high pressure are lower than critical points.

6. The adsorption heat pump according to claim 2, wherein a refrigeration cycle is performed such that one of a temperature and a pressure of the refrigerant at a time of high pressure is lower than a critical point.

* * * * *